US007752499B2

(12) United States Patent
Choudhury et al.

(10) Patent No.: US 7,752,499 B2
(45) Date of Patent: Jul. 6, 2010

(54) SYSTEM AND METHOD FOR USING RESOURCE POOLS AND INSTRUCTION POOLS FOR PROCESSOR DESIGN VERIFICATION AND VALIDATION

(75) Inventors: Shubhodeep Roy Choudhury, Karnataka (IN); Manoj Dusanapudi, Karnataka (IN); Sunil Suresh Hatti, Karnataka (IN); Shakti Kapoor, Austin, TX (US); Rahul Sharad Moharil, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 11/853,189

(22) Filed: Sep. 11, 2007

(65) Prior Publication Data
US 2009/0070768 A1 Mar. 12, 2009

(51) Int. Cl.
*G06F 11/00* (2006.01)
(52) U.S. Cl. ....................................................... 714/25
(58) Field of Classification Search ............. 714/25–28, 714/30–33, 37, 38, 45, 46; 717/106, 107, 717/124, 141–143, 147
See application file for complete search history.

(56) References Cited

U.S. PATENT DOCUMENTS

| 5,202,889 | A | | 4/1993 | Aharon et al. ................. 371/27 |
|---|---|---|---|---|
| 6,006,028 | A | * | 12/1999 | Aharon et al. ................. 703/21 |
| 6,223,337 | B1 | | 4/2001 | Blume ........................... 717/4 |
| 7,111,287 | B2 | | 9/2006 | Garvey ....................... 717/144 |
| 7,222,179 | B2 | * | 5/2007 | Srivastava et al. ........... 709/226 |
| 7,240,243 | B2 | * | 7/2007 | Decker ........................ 714/33 |
| 7,356,436 | B2 | * | 4/2008 | Bohizic et al. .............. 702/119 |
| 2004/0143819 | A1 | * | 7/2004 | Cheng et al. ................. 717/125 |
| 2005/0210452 | A1 | * | 9/2005 | Dimpsey et al. ............ 717/120 |
| 2005/0278702 | A1 | * | 12/2005 | Koyfman et al. ............ 717/124 |
| 2006/0195573 | A1 | * | 8/2006 | Srivastava et al. ........... 709/224 |
| 2006/0224863 | A1 | * | 10/2006 | Lovett et al. ................ 712/215 |

* cited by examiner

*Primary Examiner*—Nadeem Iqbal
(74) *Attorney, Agent, or Firm*—VanLeeuwen & VanLeeuwen; Matthew B. Talpis

(57) ABSTRACT

A system and method for using resource pools and instruction pools for processor design verification and validation is presented. A test case generator organizes processor resources into resource pools using a resource pool mask. Next, the test case generator separates instructions into instruction pools based upon the resources that each instruction requires. The test case generator then creates a test case using one or more sub test cases by assigning a resource pool to each sub test case, identifying instruction pools that correspond the assigned test case, and building each sub test case using instructions included in the identified instruction pools.

20 Claims, 8 Drawing Sheets

| | A Resource Types | | | | B Resource Types | | | | C Resource Types | | | Sub Test Case |
|---|---|---|---|---|---|---|---|---|---|---|---|---|
| | GPR 0-7 | GPR 8-15 | GPR 16-25 | GPR 26-32 | FPR 0-7 | FPR 8-15 | FPR 16-25 | FPR 26-32 | CR | FPSCR | XER | |
| Res. Pool D 230 | x | | x | | | x | | | x | | | Sub Test Case 1 260 |
| Res. Pool E 240 | | x | | | | | | x | | | x | Sub Test Case 2 270 |
| Res. Pool F 250 | | | | x | x | | x | | | x | | Sub Test Case 3 280 |

SYSTEM AND METHOD FOR USING RESOURCE POOLS AND INSTRUCTION POOLS FOR PROCESSOR DESIGN VERIFICATION AND VALIDATION

BACKGROUND OF THE INVENTION

1. Technical Field

The present invention relates to a system and method for using resource pools and instruction pools for processor design verification and validation. More particularly, the present invention relates to a system and method for organizing processor resources into a resource pool, assigning the resource pool to a particular sub test case, and inserting instructions into the sub test case that utilize resources within the assigned resource pool.

2. Description of the Related Art

Processor testing tools exist whose goal is to generate the most stressful test case for a processor. In theory, the generated test case should provide maximum test coverage and should be interesting enough to stress various timing scenarios on the processor. The whole technology of these tools sits in the logic of building these test cases.

Verifying and validating a processor using test cases typically includes three stages, which are 1) test case build stage, 2) test case execution stage, and 3) validation and verification stage. A challenge found is that a large amount of test cases are usually generated in order to sufficiently test a processor. Unfortunately, this consumes a tremendous amount of upfront time, which leaves little time left to test the processor.

A test case shuffler process may be implemented that creates multiple test case scenarios from a single test case by shuffling the test case instruction order while maintaining relative sub test case instruction order. A challenge found, however, is that in order to implement the shuffler process, each sub test case's resource utilization should be mutually exclusive. Otherwise, if an instruction included in a sub test case is selected for insertion into the test case and the required resource is not dedicated to the sub test case, the instruction is aborted. In turn, the test case build time increases, which results in less time for processor verification and validation.

What is needed, therefore, is a system and method that that minimizes sub test case build times for use in a test case shuffler process.

SUMMARY

It has been discovered that the aforementioned challenges are resolved using a system and method for using resource pools in conjunction with instruction pools in order to dedicate resources to particular sub test cases for use in a test case shuffler process. A test case generator organizes processor resources into resource pools using a resource pool mask. Next, the test case generator separates instructions into instruction pools based upon the resources that each instruction requires. The test case generator then creates a test case using one or more sub test cases by assigning a resource pool to each sub test case, identifying instruction pools that correspond to the assigned sub test case, and building each sub test case using instructions included in the identified instruction pools.

A test case generator identifies processor resource types (e.g., registers) and categorizes the resource types into particular resource pools. In order to properly place the resource types into the correct resource pool, the test case generator analyzes the resource types and creates "resource pool masks," which identify dependent resource types that should be grouped together, such as a floating-point status control register (FPSCR) grouped with a floating-point register (FPR).

Once the test case generator generates the resource pools, the test case generator identifies instruction types, initializes instruction pools, and creates an "instruction pool mask" for each instruction pool, such as "GPR_FPR" for instructions that utilize general-purpose registers and floating point registers. Next, the test case generator sequentially picks an instruction from a global instruction pool, decodes the instruction to identify operands and the processor resources that the instruction requires (e.g., registers). The test case generator then creates a "required resource mask" for the instruction and matches the required resource mask to the instruction pool masks in order to include the instruction in the correct instruction pool. The test case generator proceeds to sequentially pick instructions from the global instruction pool and place them into their appropriate instruction pools.

Once the test case generator finishes generating the instruction pools, the test case generator generates a test case, which includes one or more sub test cases, by 1) assigning specific resource pools to each sub test case, and 2) using instructions within instruction pools corresponding to the sub test case's assigned resource pools to build the sub test case.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
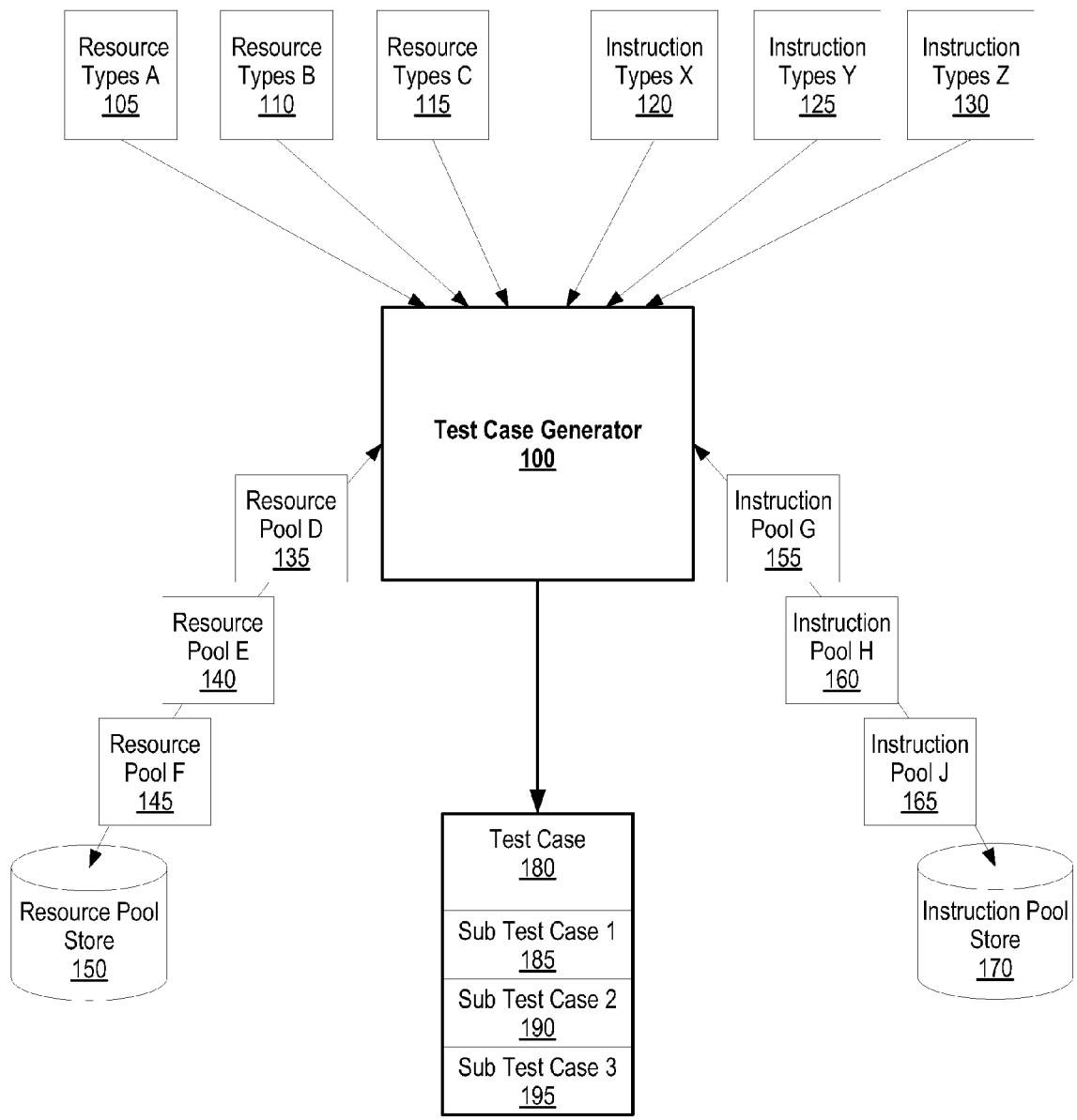
FIG. 1 is a diagram showing a test case generator generating a test case that includes sub test cases that are based upon one or more resource pools and instruction pools.

FIG. 1 is a diagram showing a test case generator generating a test case that includes sub test cases that are based upon one or more resource pools and instruction pools. Test case generator 100 receives resource types A 105, B 110, and C 115, and categorizes the resource types into particular resource pools, such as resource pools D 135, E 140, and F 140, which are stored in resource pool store 150. In order to properly place the various resource types into the correct resource pool, test case generator 100 analyzes the resource types, and creates resource pool masks that identify dependent resource types that should be grouped together. For example, a floating-point status control register (FPSCR) should be grouped with a floating-point register (FPR) since an instruction that modifies the FPSCR also requires an FPR (see FIG. 3 and corresponding text for further details).

Once test case generator 100 generates the resource pools, test case generator 100 receives instruction types X 120, Y 125, and Z 130. Test case generator 100 initializes instruction pools G 155, H 160, and J 165, which are stored in instruction pool store 170, and creates an "instruction pool mask" for each instruction pool. For example, an instruction pool mask may be created for instruction pool G 155 to include instructions that utilize particular processor resources, such as "GPR_FPR," for instructions that utilize general-purpose registers and floating point registers. Instruction pool store 170 may be stored on a nonvolatile storage area, such as a computer hard drive.

Once test case generator 100 generates the instruction pool masks, test case generator 100 picks an instruction from a global instruction pool, decodes the instruction to identify operands (e.g., registers) and the processor resources that the instruction requires. The global instruction pool includes descriptions and definitions for architecturally defined instructions that correspond to a particular processor (e.g., an instruction set of a processor). In one embodiment, test case generator 100 sequentially picks instructions from the global instruction pool in order to ensure that each instruction is selected from the global instruction pool. Test case generator 100 then creates a "required resource mask" for the instruction and matches the required resource mask to the instruction pool masks for instruction pools G 155, H 160, and J 165. Test case generator 100 includes the instruction in matched instruction pool, and proceeds to sequentially pick instructions from X instruction types 120, Y instruction types 125, and Z instruction types 130 and place them in appropriate instruction pools.

Once test case generator 100 is finished generating the instruction pools, test case generator 100 is ready to generate a test case that includes one or more sub test cases, such as test case 180. Test case generator 100 generates test case 180 by assigning specific resource pools to each sub test case 1 185, 2 190, and 3 195, and then building the sub test cases using instructions that are included in instruction pools that correspond to the assigned resource pools (see FIG. 5 and corresponding text for further details).

Figures 2A, 2B:
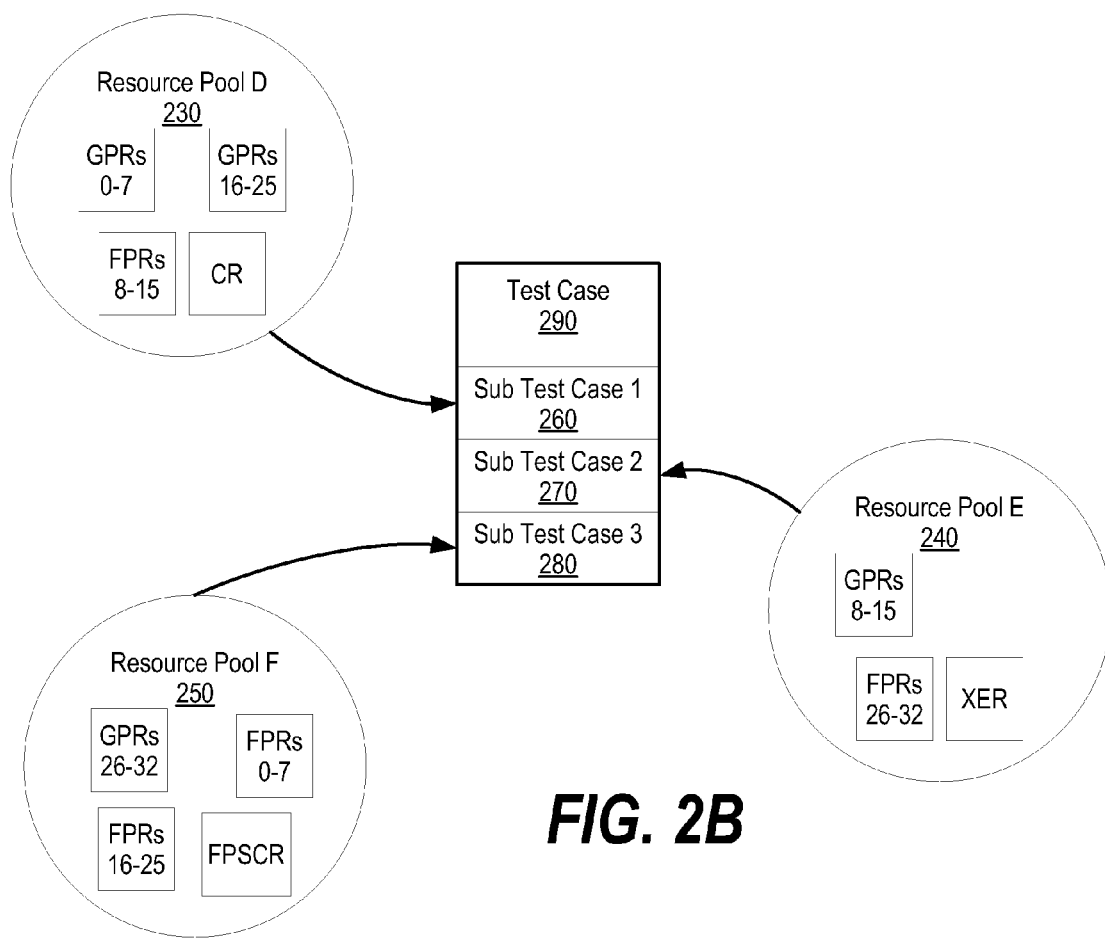
FIG. 2A is a table showing relationships between resource types, resource pools, and sub test cases.
FIG. 2B is a diagram showing resource pools that are assigned to particular sub test cases.

FIG. 2A is a table showing relationships between resource types, resource pools, and sub test cases. Table 200 includes columns 202 through 222, which correspond to particular processor resources (e.g., registers). The processor resources are organized by particular resource types. For example, columns 202-208 are general-purpose registers (GPRs) that are grouped in 8-register increments. Likewise, columns 210 through 216 are floating point registers (FPRs) that are also grouped in 8-register increments. And, columns 218 through 222 each include a specific resource, such as a conditional register (CR), and floating point status control register (FPSCR), and an exception register (XER).

Figure 3:
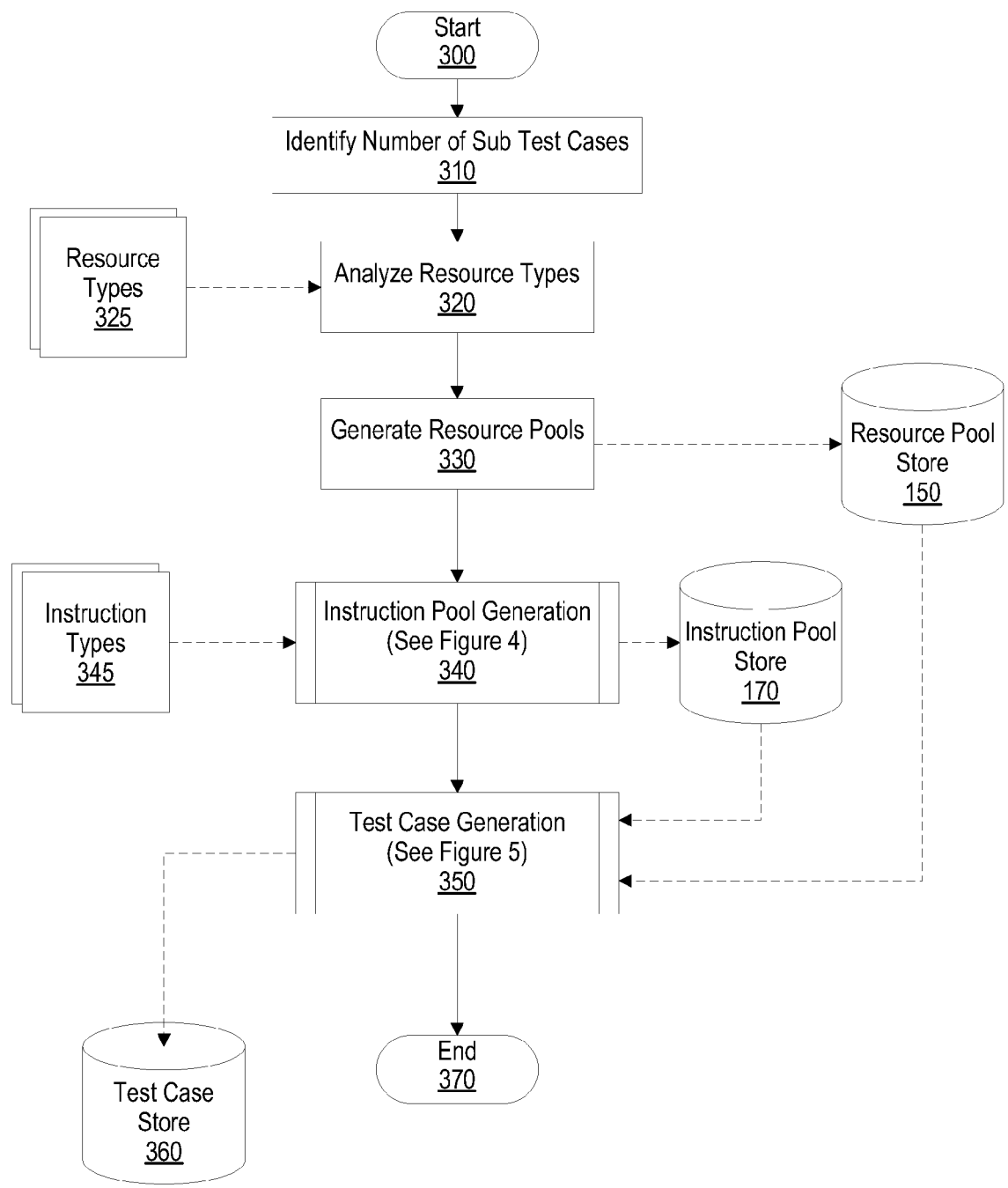
FIG. 3 is a flowchart showing steps taken in generating a test case that includes sub test cases, which each include particular instructions based upon assigned resource pools.

A test case generator assigns particular resources to individual resource pools D 230, E 240, and F 250, based upon resource pool masks (see FIG. 3 and corresponding text for further details). As can be seen in FIG. 2A, resource pool D 230 includes GPRs 0-7, GPRs 16-25, FPRs 8-15, and CR. Once the test case generator assigns resources to the resource pools, the test case generator assigns the resource pools to sub test cases 1 260, 2 270, and 3 280. As can be seen, resource pool D 230 is assigned to sub test case 1 260, resource pool E 240 is assigned to sub test case 2 270, and resource pool F 250 is assigned to sub test case 3 280.

FIG. 2B is a diagram showing resource pools that are assigned to particular sub test cases. As can be seen, test case 290 includes sub test case 1 260, sub test case 2 270, and sub test case 3 280. Resource pools are assigned to each of these sub test cases (resource pools D 230, E 240, and F 250), which allows a test case generator to select particular instructions to include in the test cases that utilize the resources included in the assigned resource pools. For example, an instruction that requires an FPSCR resource is included in sub test case 3 280 because the FPSCR is assigned to sub test case 3 280.

FIG. 3 is a flowchart showing steps taken in generating a test case that includes sub test cases, which each include particular instructions based upon assigned resource pools.

Processing commences at 300, whereupon processing identifies the number of sub test cases to include in a test case. At step 320, processing analyzes resource types 325, which corresponds to processor resources, such as registers, that an instruction utilizes during execution. At step 330, processing generates resource pools based upon the analysis and the number of sub test cases to generate, and stores the resource pools in resource pool store 150, which is the same as that shown in FIG. 1. During the resource pool generation, processing creates resource pool masks that identify dependent resource types that should be grouped together. For example, a floating-point status control register (FPSCR) should be grouped with a floating-point register (FPR) since an instruction that modifies the FPSCR also requires an FPR.

Figure 4:
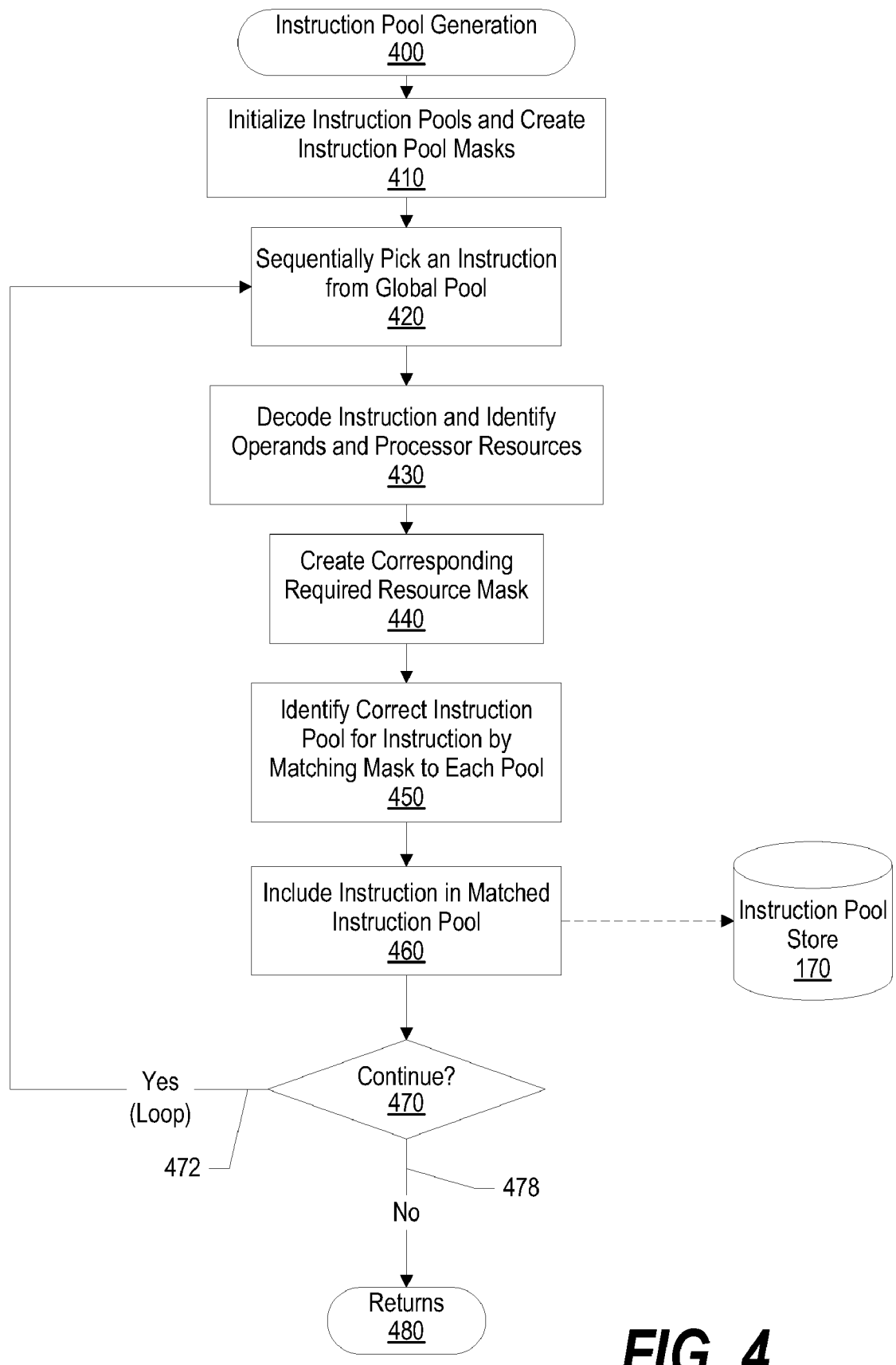
FIG. 4 is a flowchart showing steps taken in generating instruction pools for use in generating a test case.

Next, processing generates instruction pools using instruction types 345 and stores the instruction pools in instruction pool store 170, which is the same as that shown in FIG. 1 (pre-defined process block 340, see FIG. 4 and corresponding text for further details). While generating instruction pools, processing creates a "required resource mask" for each instruction that identifies resources that each particular instruction requires.

Figure 5:
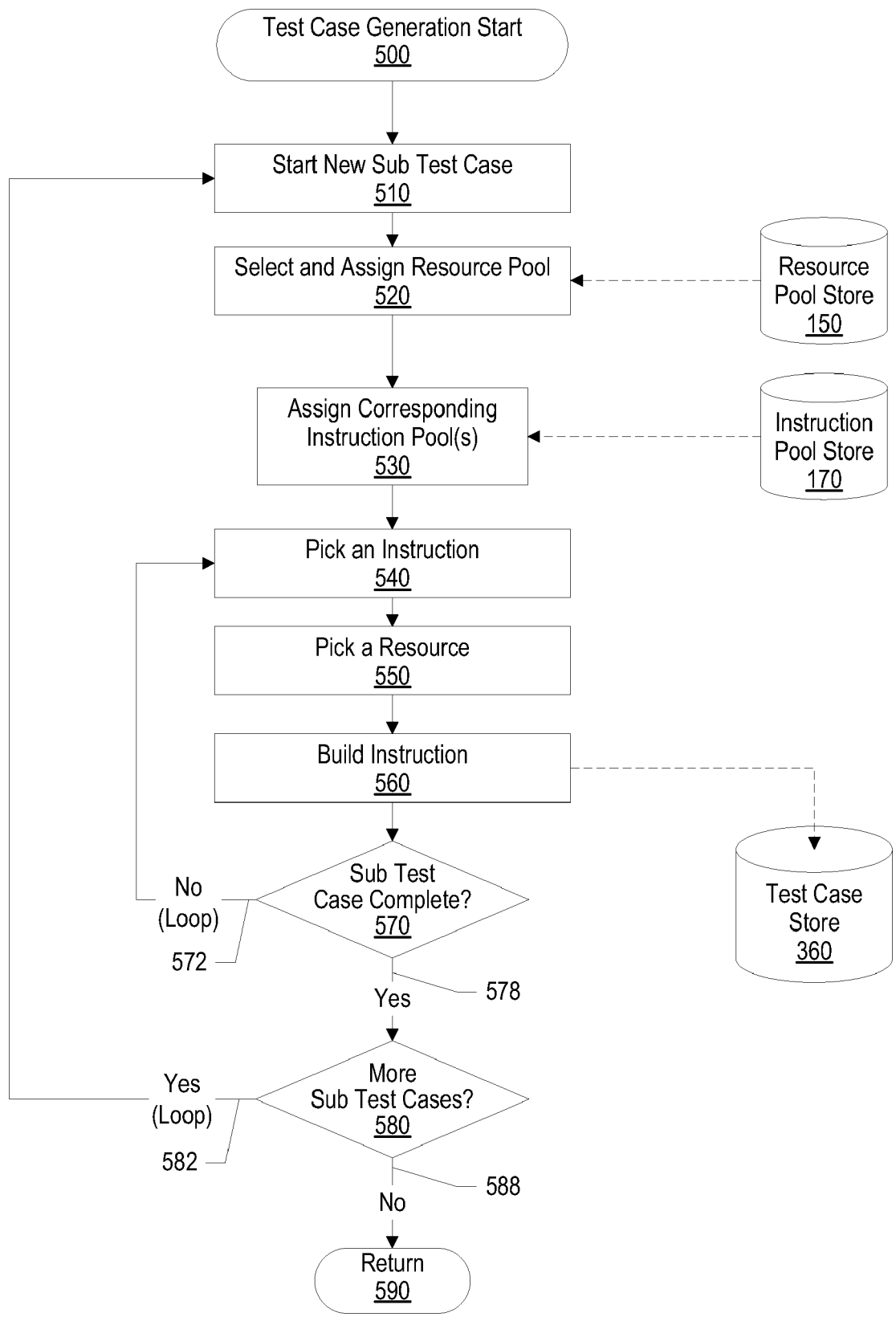
FIG. 5 is a flowchart showing steps taken in generating a test case.

Once the resource pools and instruction pools are generated, processing generates a test case, which includes sub test cases, by assigning specific resource pools to each sub test case and then building the sub test cases using instructions that are included in instruction pools that correspond to the assigned resource pools (pre-defined process block 350, see FIG. 5 and corresponding text for further details). Processing stores the test cases in test case store 360 for later disbursement to a test case executor. Test case store 360 may be stored on a nonvolatile or volatile storage area, such as computer memory or a computer hard drive. Processing ends at 370.

FIG. 4 is a flowchart showing steps taken in generating instruction pools for use in generating a test case.

Processing commences at 400, whereupon processing initializes instruction pools and creates an instruction pool mask for each instruction pool (step 410). For example, an instruction pool mask may be created for an instruction pool to include instructions that utilize particular processor resources, such as "GPR_FPR" for instructions that utilize general-purpose registers and floating point registers. In addition, an instruction pool mask may be created for an instruction pool to support instructions that utilize dependent resources, such as "FPR_FPSCR" for instructions that utilize a floating point status control register that, in turn, requires access to a floating point register.

At step 420, processing sequentially picks an instruction from a global instruction pool and, at step 430, processing decodes the instruction to identify operands and the processor resources that the instruction requires. Next, processing creates a required resource mask for the instruction based upon the processor resources that the instruction requires (step 440). Once processing creates the required resource mask, processing matches the required resource mask to the instruction pool masks (step 450), and includes the instruction in the instruction pool that corresponds to the matched instruction pool mask located in instruction pool store 170, which is the same as that shown in FIG. 1 (step 460).

A determination is made as to whether there are more instructions to place into an instruction pool (decision 470). If there are more instructions, decision 470 branches to "Yes" branch 472, which loops back to select and process the next instruction. This looping continues until each instruction is placed into an instruction pool, at which time decision 470 branches to "No" branch 478 whereupon processing returns at 480.

FIG. 5 is a flowchart showing steps taken in generating a test case. Processing commences at 500, whereupon processing starts a new sub test case at step 510. At step 520, processing selects and assigns one or more resource pools to the sub test case from resource pool store 150. The number of resource pools that are assigned to each sub test case is dependent upon the number of sub test cases to be included in the test case (see FIG. 3 and corresponding text for further details). Resource pool store 150 is the same as that shown in FIG. 1.

Next, processing assigns instruction pools from instruction pool store 170 to the sub test case by comparing the resource pool masks, which correspond to the assigned resource pools, to instruction pool masks. For example, if a sub test case is assigned a resource pool that includes general purpose registers (GPRs) and floating point registers (FPRs), processing assigns one or more instruction pools to the sub test case that require GPRs and FPRs.

Once the instruction pools are assigned to the sub test case, processing picks an instruction from one of the assigned instruction pools at step 540. At step 550, processing picks a resource that the instruction requires from one of the resource pools. Processing then builds the instruction using the resource and includes it in the sub test case, which is stored in test case store 360 (step 560). Test case store 360 is the same as that shown in FIG. 1.

A determination is made as to whether the sub test case is complete (decision 570). If the sub test case is not complete (e.g., requires more instructions), decision 570 branches to "No" branch 572, which loops back to select and build another instruction. This looping continues until the sub test case is complete, at which point decision 570 branches to "Yes" branch 578 whereupon a determination is made as to whether to start a new sub test case (decision 580). If processing should start another sub test case, decision 580 branches to "Yes" branch 582, which loops back to start a new sub test case. This looping continues until all sub test cases are complete, at which point decision 580 branches to "No" branch 588 whereupon processing returns at 590.

Figure 6:
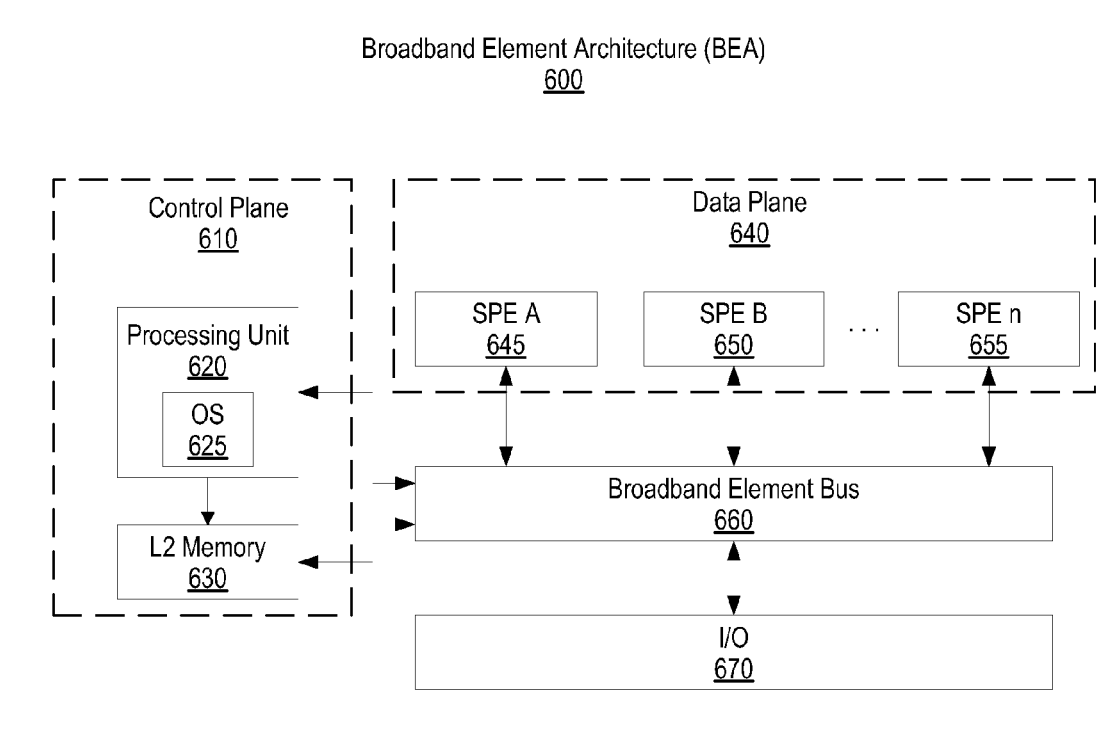
FIG. 6 is a diagram showing a broadband element architecture that includes a plurality of heterogeneous processors capable of implementing the invention described herein.

FIG. 6 is a diagram showing a broadband element architecture which includes a plurality of heterogeneous processors capable of implementing the invention described herein. The heterogeneous processors share a common memory and a common bus. Broadband element architecture (BEA) 600 sends and receives information to/from external devices through input output 670, and distributes the information to control plane 610 and data plane 640 using processor element bus 660. Control plane 610 manages BEA 600 and distributes work to data plane 640.

Control plane 610 includes processing unit 620 which runs operating system (OS) 625. For example, processing unit 620 may be a Power PC core that is embedded in BEA 600 and OS 625 may be a Linux operating system. Processing unit 620 manages a common memory map table for BEA 600. The memory map table corresponds to memory locations included in BEA 600, such as L2 memory 630 as well as non-private memory included in data plane 640.

Data plane 640 includes Synergistic processing element's (SPE) 645, 650, and 655. Each SPE is used to process data information and each SPE may have different instruction sets. For example, BEA 600 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU) which is a processing core, such as a digital signal processor, a microcontroller, a microprocessor, or a combination of these cores.

SPE 645, 650, and 655 are connected to processor element bus 660, which passes information between control plane 610, data plane 640, and input/output 670. Bus 660 is an on-chip coherent multi-processor bus that passes information between I/O 670, control plane 610, and data plane 640. Input/output 670 includes flexible input-output logic which dynamically assigns interface pins to input output controllers based upon peripheral devices that are connected to BEA 600.

Figure 7:
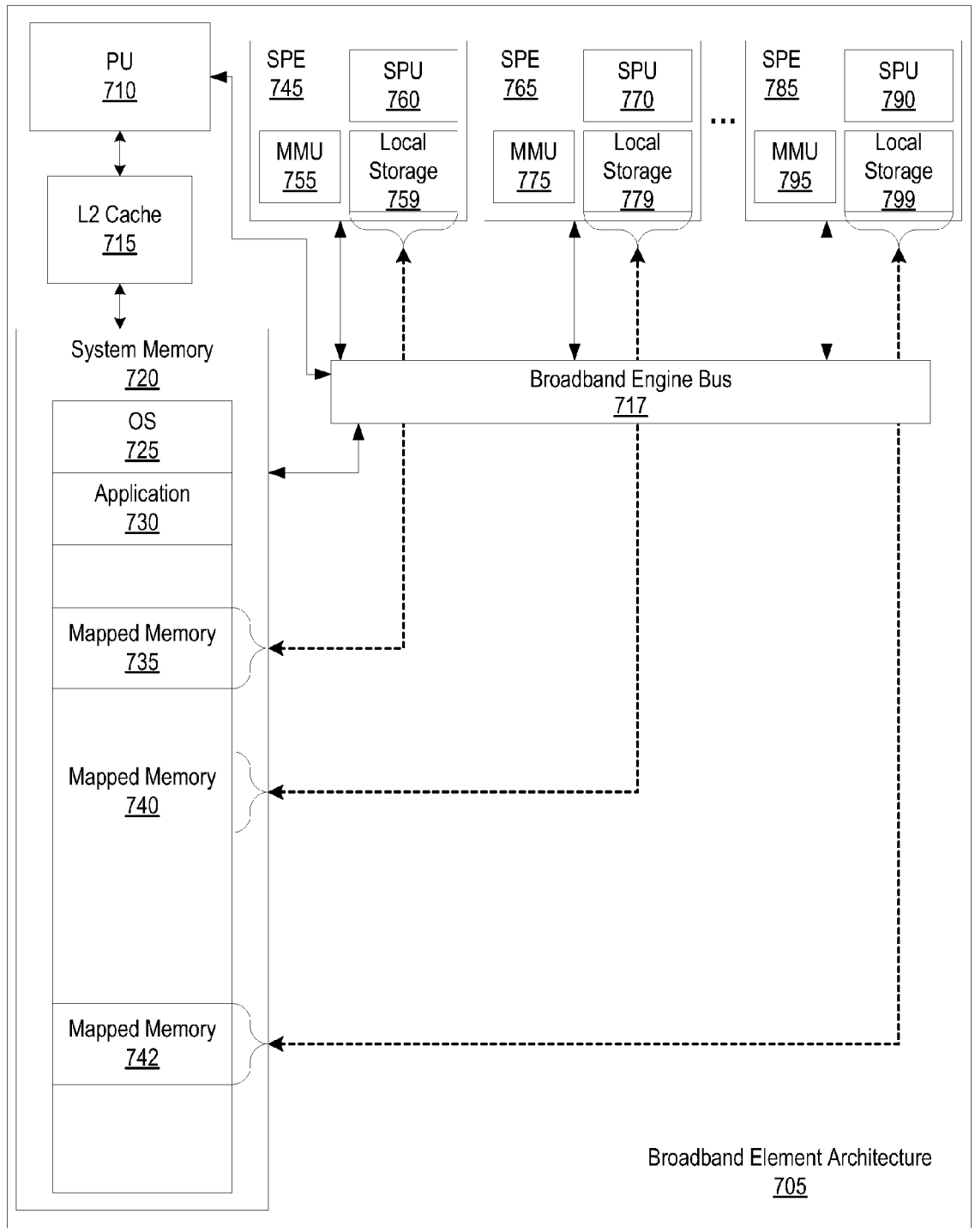
FIG. 7 is a block diagram illustrating a processing element having a main processor and a plurality of secondary processors sharing a system memory.

FIG. 7 is a block diagram illustrating a processing element having a main processor and a plurality of secondary processors sharing a system memory. Broadband Element Architecture (BEA) 705 includes processing unit (PU) 710, which, in one embodiment, acts as the main processor and runs the operating system. Processing unit 710 may be, for example, a Power PC core executing a Linux operating system. BEA 705 also includes a plurality of synergistic processing elements (SPEs) such as SPEs 745 through 785. Each SPE includes a synergistic processing unit (SPU) that act as secondary processing units to PU 710, a memory storage unit, and local storage. For example, SPE 745 includes SPU 760, MMU 755, and local storage 759; SPE 765 includes SPU 770, MMU 775, and local storage 779; and SPE 785 includes SPU 790, MMU 795, and local storage 799.

In one embodiment, the SPEs process data under the control of PU 710. The SPEs may be, for example, digital signal processing cores, microprocessor cores, micro controller cores, etc., or a combination of the above cores. In one embodiment, each one of the local stores is a storage area associated with a particular SPU. Each SPU can configure its local store as a private storage area, a shared storage area, or an SPU's local store may be partly private and partly shared.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 710 and by the other SPEs. An SPU may reserve part of its local store in order for the SPU to have fast, guaranteed access to some memory when performing tasks that require such fast access. The SPU may also reserve some of its local store as private when processing sensitive data, as is the case, for example, when the SPU is performing encryption/decryption.

The MMUs are responsible for transferring data between an SPU's local store and the system memory. In one embodiment, an MMU includes a direct memory access (DMA) controller configured to perform this function.

Each SPE may be set up to perform a different task, and accordingly, in one embodiment, each SPE may be accessed using different instruction sets. If BEA 705 is being used in a wireless communications system, for example, each SPE may be responsible for separate processing tasks, such as modulation, chip rate processing, encoding, network interfacing, etc. In another embodiment, each SPE may have identical instruction sets and may be used in parallel to perform operations benefiting from parallel processes.

The shared portion of the SPEs' local stores may be accessed by PU 710 as well as by the other SPEs by mapping each shared region to system memory 720. In one embodiment, PU 710 manages the memory map for the common system memory 720. The memory map table may include PU 710's L2 Cache 715, system memory 720, as well as the SPEs' shared local stores.

A portion of system memory 720 as shown is occupied by the operating system (OS 725). System Memory 725 also contains data 740, which represents data to be processed by SPU 710 as well as by the SPEs. In one embodiment, a process executing on the PU receives a request for a task involving the processing of large data. The PU first determines an optimum method for performing the task as well as an optimum placement of the data in common system memory 720. The PU may then initiate a transfer of the data to be processed from disk 735 to system memory 720. In one embodiment, the PU arranges the data in system memory 725 in data blocks the size of the registers of the SPEs. In one embodiment, the SPEs may have 128 registers, each register being 128 bits long.

The PU then searches for available SPEs and assigns blocks of data to any available SPEs for processing of the data. The SPEs can access the common system memory (through a DMA command, for example) transfer the data to the SPEs' local store, and perform the assigned operations. After processing the data, the SPEs may transfer the data (using DMA again, for example) back to common system memory 720. This procedure may be repeated as SPEs become available until all the data blocks have been processed.

Figure 8:
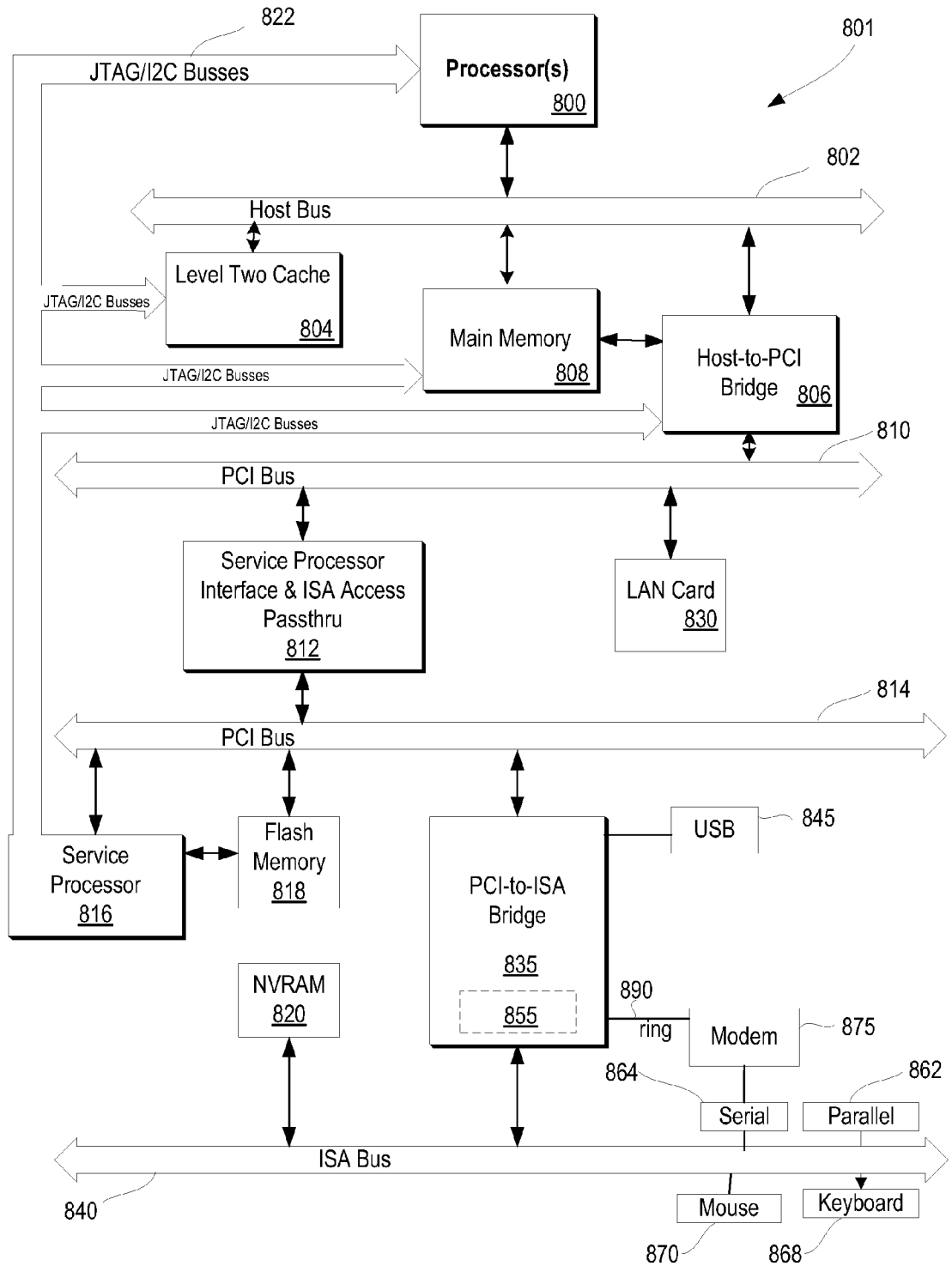
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 865 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 601 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   generating a plurality of resource pools, wherein each of the resource pools includes one or more processor resources;
   generating a plurality of instruction pools, wherein each of the instruction pools includes one or more instructions from a global instruction pool and wherein the one or more instructions are grouped into one of the plurality of instruction pools based upon one or more of the processor resources they require;
   assigning one or more of the resource pools to a sub test case;
   based upon the one or more resource pools that are assigned to the sub test case, assigning one or more instruction pools to the sub test case that correspond to the assigned resource pools; and
   building the sub test case using the instructions included in the one or more assigned instruction pools.

2. The method of claim 1 wherein the generation of the plurality of resource pools further comprises:
   analyzing the plurality of resources;
   in response to the analyzing, creating a resource pool mask for each of the plurality of resource pools; and
   assigning each of the plurality of processor resources to one of the plurality of resource pools based upon their corresponding resource pool mask.

3. The method of claim 2 wherein the resources that depend upon each other are assigned to the same resource pool.

4. The method of claim 1 further comprising:
   creating an instruction pool mask for each of the instruction pools;
   selecting one of the instructions from the global instruction pool;
   decoding the selected instruction to identify corresponding required resources;
   creating a required resource mask for the selected instruction based upon the selected instruction's identified required resources;
   matching the required resource mask to one of the instruction pools; and
   assigning the selected instruction to the instruction pool that corresponds to the matched instruction pool mask.

5. The method of claim 1 wherein the processor resources are registers that are used by a processor during the execution of the instruction.

6. The method of claim 5 wherein one of the registers is selected from the group consisting of a conditional register, a floating point status control register, and an exception register.

7. The method of claim 1 further comprising:
   identifying a number of sub test cases to build;
   assigning a number of resource pools to the sub test case based upon the identified number of sub test cases to build.

8. An information handling system comprising:
   one or more processors;
   a memory accessible by the processors;
   one or more nonvolatile storage devices accessible by the processors; and
   a set of instructions stored in the memory, wherein one or more of the processors executes the set of instructions in order to perform actions of:
      generating a plurality of resource pools, wherein each of the resource pools includes one or more processor resources;
      generating a plurality of instruction pools, wherein each of the instruction pools includes one or more instructions from a global instruction pool and wherein the one or more instructions are grouped into one of the plurality of instruction pools based upon one or more of the processor resources they require;
      assigning one or more of the resource pools to a sub test case;
      based upon the one or more resource pools that are assigned to the sub test case, assigning one or more instruction pools to the sub test case that correspond to the assigned resource pools; and
      building the sub test case using the instructions included in the one or more assigned instruction pools.

9. The information handling system of claim 8 further comprising an additional set of instructions in order to perform actions of:
   analyzing the plurality of resources;
   in response to the analyzing, creating a resource pool mask for each of the plurality of resource pools; and
   assigning each of the plurality of processor resources to one of the plurality of resource pools based upon their corresponding resource pool mask.

10. The information handling system of claim 9 wherein the resources that depend upon each other are assigned to the same resource pool.

11. The information handling system of claim 8 further comprising an additional set of instructions in order to perform actions of:
   creating an instruction pool mask for each of the instruction pools;
   selecting one of the instructions from the global instruction pool;
   decoding the selected instruction to identify corresponding required resources;
   creating a required resource mask for the selected instruction based upon the selected instruction's identified required resources;
   matching the required resource mask to one of the instruction pools; and
   assigning the selected instruction to the instruction pool that corresponds to the matched instruction pool mask.

12. The information handling system of claim 8 wherein the processor resources are registers that are used by a processor during the execution of the instruction.

13. The information handling system of claim 12 wherein one of the registers is selected from the group consisting of a conditional register, a floating point status control register, and an exception register.

14. A computer program product stored on a computer operable media, the computer operable media containing instructions for execution by a computer, which, when executed by the computer, cause the computer to implement a method of processing test patterns, the method comprising:

generating a plurality of resource pools, wherein each of the resource pools includes one or more processor resources;

generating a plurality of instruction pools, wherein each of the instruction pools includes one or more instructions from a global instruction pool and wherein the one or more instructions are grouped into one of the plurality of instruction pools based upon one or more of the processor resources they require;

assigning one or more of the resource pools to a sub test case;

based upon the one or more resource pools that are assigned to the sub test case, assigning one or more instruction pools to the sub test case that correspond to the assigned resource pools; and building the sub test case using the instructions included in the one or more assigned instruction pools.

15. The computer program product of claim 14 wherein the method further comprises:

analyzing the plurality of resources;

in response to the analyzing, creating a resource pool mask for each of the plurality of resource pools; and assigning each of the plurality of processor resources to one of the plurality of resource pools based upon their corresponding resource pool mask.

16. The computer program product of claim 15 wherein the resources that depend upon each other are assigned to the same resource pool.

17. The computer program product of claim 14 wherein the method further comprises:

creating an instruction pool mask for each of the instruction pools;

selecting one of the instructions from the global instruction pool;

decoding the selected instruction to identify corresponding required resources;

creating a required resource mask for the selected instruction based upon the selected instruction's identified required resources;

matching the required resource mask to one of the instruction pools; and assigning the selected instruction to the instruction pool that corresponds to the matched instruction pool mask.

18. The computer program product of claim 14 wherein the processor resources are registers that are used by a processor during the execution of the instruction.

19. The computer program product of claim 18 wherein one of the registers is selected from the group consisting of a conditional register, a floating-point status control register, and an exception register.

20. The computer program product of claim 14 wherein the method further comprises:

identifying a number of sub test cases to build;

assigning a number of resource pools to the sub test case based upon the identified number of sub test cases to build.

\* \* \* \* \*